US010766692B2

(12) United States Patent
Oskarsson et al.

(10) Patent No.: US 10,766,692 B2
(45) Date of Patent: Sep. 8, 2020

(54) REUSEABLE SHIPPING CONTAINER FOR PERISHABLE FOOD PRODUCTS

(71) Applicant: Saeplast Americas Inc., Saint John, New Brunswick (CA)

(72) Inventors: Dagur Oskarsson, Saint John (CA); Brian Gooding, Saint John (CA); Arnar Snorrason, Saint John (CA)

(73) Assignee: SAEPLAST AMERICAS INC., Saint John (CA)

( * ) Notice: Subject to any disclaimer, the term of this patent is extended or adjusted under 35 U.S.C. 154(b) by 150 days.

(21) Appl. No.: 15/381,475

(22) Filed: Dec. 16, 2016

(65) Prior Publication Data

US 2017/0320656 A1 Nov. 9, 2017

(30) Foreign Application Priority Data

May 9, 2016 (CA) .................................... 2929342

(51) Int. Cl.
| | |
|---|---|
| *B65D 21/032* | (2006.01) |
| *B65D 85/00* | (2006.01) |
| *B65D 6/00* | (2006.01) |
| *B65D 21/02* | (2006.01) |
| *B65D 25/54* | (2006.01) |

(Continued)

(52) U.S. Cl.
CPC ............... *B65D 85/70* (2013.01); *B65D 1/22* (2013.01); *B65D 1/40* (2013.01); *B65D 11/10* (2013.01); *B65D 11/20* (2013.01); *B65D 21/0215* (2013.01); *B65D 21/0222* (2013.01); *B65D 21/0223* (2013.01); *B65D 25/24* (2013.01); *B65D 25/54* (2013.01); *B65D 43/02* (2013.01);

(Continued)

(58) Field of Classification Search
CPC .. B65D 81/261; B65D 25/54; B65D 21/0215; B65D 1/22
USPC .......................................... 220/507; 206/509
See application file for complete search history.

(56) References Cited

U.S. PATENT DOCUMENTS 3,534,866 A * 10/1970 Asenbauer ......... A47B 87/0269
206/507
4,195,744 A 4/1980 Christianson
(Continued)

FOREIGN PATENT DOCUMENTS

| | | |
|---|---|---|
| DE | 2737237 A1 | 3/1979 |
| EP | 2108593 A1 | 10/2009 |
| WO | 1990014295 A1 | 11/1990 |

OTHER PUBLICATIONS

Machine translation of Panick DE 2737237.*
Lazar, Virginia "Listeria Benchmark: O", Meat Processing—North American Edition, Covering Meat & Poultry, Nov. 2003, 4 pages.

*Primary Examiner* — Stephen J Castellano
(74) *Attorney, Agent, or Firm* — Patterson + Sheridan, LLP

(57) ABSTRACT

A reusable container is provided for storage and transport of prepared meat in log format. The container has a base, a pair of upwardly extending side walls, and a pair of upwardly extending end walls connected with the side walls to form a generally rectangular box. The box has four interior edges and four interior corners where the side and end walls join the base. The box is integrally formed of molded polyethylene. Each of the four interior edges and four interior corners has a rounded interior profile to prevent accumulation of material and facilitate sanitation between uses. A reusable container system is also provided having a removable lid, and access panel.

22 Claims, 7 Drawing Sheets

(51) Int. Cl.
  *B65D 1/22* (2006.01)
  *B65D 1/40* (2006.01)
  *B65D 25/24* (2006.01)
  *B65D 43/02* (2006.01)
  *B65D 81/26* (2006.01)

(52) U.S. Cl.
  CPC ........ *B65D 81/261* (2013.01); *B65D 2501/24* (2013.01); *B65D 2543/00296* (2013.01)

(56) References Cited

U.S. PATENT DOCUMENTS

| | | | | |
|---|---|---|---|---|
| 5,007,569 | A * | 4/1991 | Zarb | B60R 7/043 220/505 |
| 5,161,690 | A * | 11/1992 | Foshaug | B65D 19/02 206/512 |
| 5,429,236 | A * | 7/1995 | Evans | B65D 19/0016 108/55.1 |
| 5,605,246 | A * | 2/1997 | Rausch, Sr. | B65D 25/005 206/454 |
| 6,253,948 | B1 * | 7/2001 | Ficker | B65D 21/0223 220/350 |
| 7,389,608 | B1 * | 6/2008 | MacKay | A01K 97/05 206/315.11 |
| 8,740,005 | B1 * | 6/2014 | Holbrook | B65D 88/06 220/4.13 |
| 8,960,469 | B1 * | 2/2015 | Helal | B65D 21/0204 220/23.6 |
| 2006/0070905 | A1 * | 4/2006 | Hampel | B65D 21/0223 206/403 |
| 2014/0224795 | A1 | 8/2014 | Pamall | |
| 2014/0352350 | A1 * | 12/2014 | Wickline | F25D 3/08 62/457.7 |

* cited by examiner

REUSEABLE SHIPPING CONTAINER FOR PERISHABLE FOOD PRODUCTS

CROSS-REFERENCE TO RELATED APPLICATIONS

This application claims benefit of Canadian patent application number 2,929,342, filed May 9, 2016, which is herein incorporated by reference.

Field of the Invention

The invention relates to containers for perishable food products, and more particularly relates to reusable containers for shipping or storing bulk meat products especially those typically in log format.

BACKGROUND OF THE INVENTION

Description of the Related Art

For many years, bulk meat has been shipped in reusable open-top stainless steel containers, sometimes referred to as "coffins" (see "prior art" FIGS. 1 and 2). The coffins used to ship processed meat logs for slicing in food service (e.g. processed deli turkey, deli chicken, or ham) are large and extremely heavy (over 500 lbs pre-loaded). Typically, in a processor plant, or warehouse, the coffins are transported by forklift. The scraping of the container feet on floors is loud and piercing and repetitive throughout a facility over the course of a day. Further, due to the construction of the stainless steel containers (typically made to order by a sheet metal fabricator), handling of the containers by employees can lead to injury. The sheets of steel are turned over or rolled at the tops and sides, but sharp burrs and corners persist, and these can lead to dangerous cuts. For all of these reasons, loading and handling of stainless steel "coffin" containers in the processed meat industry has come under scrutiny for occupational health and safety.

Besides safe handling issues, the containers have other drawbacks. The containers themselves are not easy to clean, sanitize or maintain (e.g. patching when damaged). There are potential food safety issues due to build up of residue in the containers, which do not drain very efficiently. The fabricated inside edges and corners tend to trap material. For food safety, a container must be lined each time with a plastic polyethylene liner, and the loaded container must be covered on the top with a plastic polyethylene top sheet cover. This requires an additional packaging step and material expense (liner/wrap).

It would be desirable to provide an alternative structure for such meat coffins which would address or mitigate the foregoing drawbacks.

SUMMARY OF THE INVENTION

According to a first aspect of the invention, a reusable container is provided for storage and transport of a perishable food product. The container has a base, a pair of upwardly extending side walls, and a pair of upwardly extending end walls connected with the side walls to form a generally rectangular box. The box has four interior edges and four interior corners where the side and end walls join the base. The box is integrally formed from a single piece of molded polyethylene (preferably, polyethylene foam). Each of the four interior edges and four interior corners has a rounded interior profile to prevent accumulation of material and facilitate sanitation between uses.

At least one of the side or end walls may also include a window for receiving a removable access panel to facilitate loading and unloading of food product (e.g. meat logs).

An upper edge of each of the side and end walls may be configured to receive a removable lid.

At least one of the side or end walls may have a drainage hole proximate to the base. This drainage hole may be threaded.

Preferably, the box is at least 5 feet in length, and at least 2 feet in width (and at least 2 feet deep). Preferably, the box has an interior volume of at least approximately 20 ft$^3$ (and more preferably, an interior volume of approximately 40-50 ft$^3$). In a typical embodiment, the walls are approximately 1 inch thick, while the base is generally slightly thicker.

In one preferred embodiment, the box is rotationally molded. Preferably, the interior core of the material is polyethylene foam (injected polyethylene with a blowing agent), while the outer skins are of solid polyethylene. In another embodiment, the material is comprised of solid polyethylene with a hollow core. Other embodiments (e.g. solid or closed cell polyethylene) may also be possible, although the additional weight be undesirable in certain applications.

The base may have feet. The feet are preferably spaced apart to provide gaps for receiving forks of a forklift.

Preferably, the box has a weight of less than 400 lbs (and more preferably a weight of less than 350 lbs).

According to a second aspect of the invention, a reusable container system is provided for storage and transport of a perishable food product. A container is provided that has a base, a pair of upwardly extending side walls, and a pair of upwardly extending end walls connected with the side walls to form a generally rectangular box. The box has four interior edges and four interior corners where the side and end walls join the base. A removable access panel is defined in at least one of the side or end walls. A removable lid is provided that is sized to cover the container. The box, the access panel, and the lid are each integrally formed of molded polyethylene, and each has smooth interior surface to prevent accumulation of material and facilitate sanitation between uses.

Preferably, the molded polyethylene of the box is a polyethylene foam having outer skins of solid polyethylene. At least one of the lid and the removable access panel may be hollow.

The base may have feet. In this case, the lid may have alignment features that are disposed for receiving the feet of an adjacent base when the containers are stacked vertically.

Preferably, the combined overall weight of the container, access panel, and lid is less than 500 lbs (and more preferably less than 400 lbs).

The removable access panel may be defined within a window extending from an upper edge of the side or end wall to a lower edge disposed at a distance above the base. The window may be quadrilateral, e.g. trapezoidal, in shape. The window and access panel may have a tongue and groove arrangement. In one preferred embodiment, the removable access panel is slidably receivable in the window.

DETAILED DESCRIPTION

Figure 1:
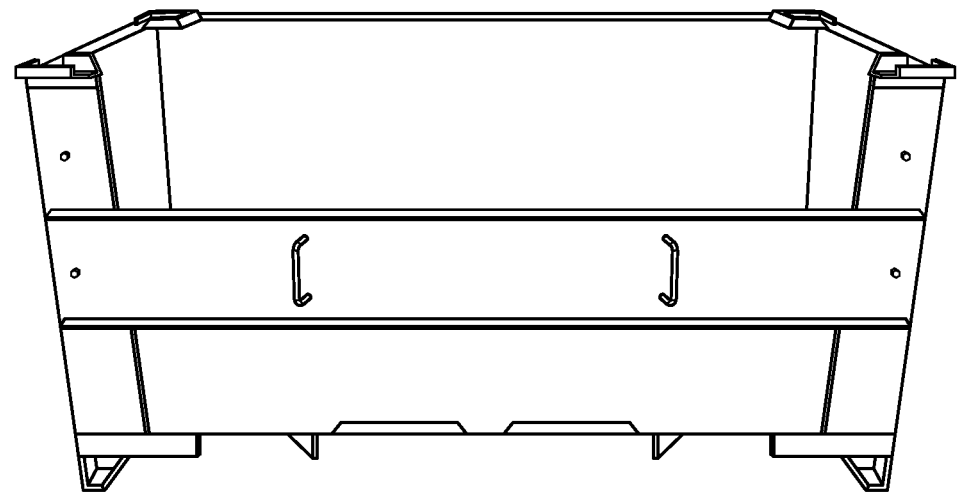
FIG. 1 shows a prior art shipping container of stainless steel.
Figure 2:
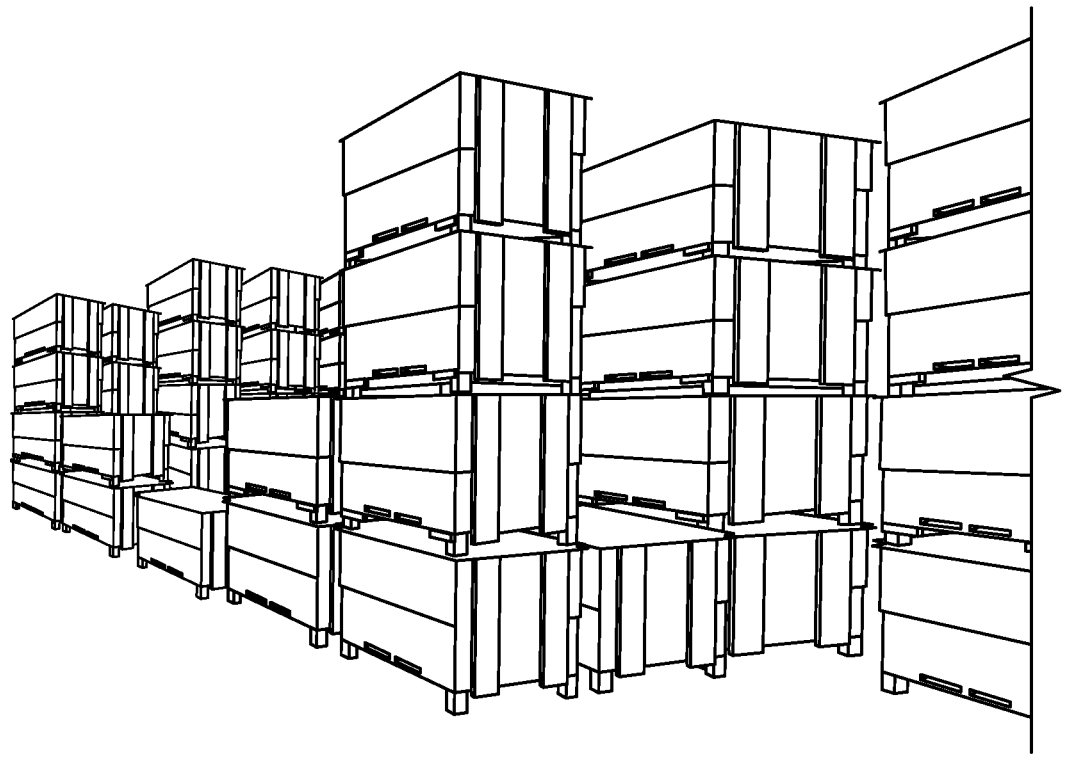
FIG. 2 shows prior art steel shipping containers in loaded state with plastic tarps to cover.

FIGS. 1 and 2 show the prior art stainless steel coffins. FIG. 2 shows the coffins stacked in a loaded state with polyethylene (stretch) cover wraps and liners to protect the product. The stainless steel containers are difficult to safely stack, and may not be able to be stacked at all for transportation. Some prior stainless steel coffins (such as those shown in FIGS. 1-2) use a removable side panel which attaches using knobs. These knobs break easily and are sharp as they protrude from the container. Further, the edges and corners of the stainless steel containers are sharp and can lead to injury. This has been the situation for many years and has been tolerated due to a lack of viable alternatives. The meat product the boxes are designed to carry is heavy and of an awkward size. Wood and many plastics, which might be sufficiently strong, are not able to meet evolving food safety requirements. Wood in particular is porous and absorbs blood water, an obvious source of contamination and bacteria.

In response, the present invention uses a lightweight polyethylene material that is 100% food grade resin. One presently preferred material is SAEPLAST® PE from RPC-Promens AS, which is a molded polyethylene featuring a closed cell exterior skin and closed cell foamed interior. Because the material is food grade, it can be contacted directly by the food product, avoiding the need for separate plastic liners and covers to protect the meat.

Figure 3A:
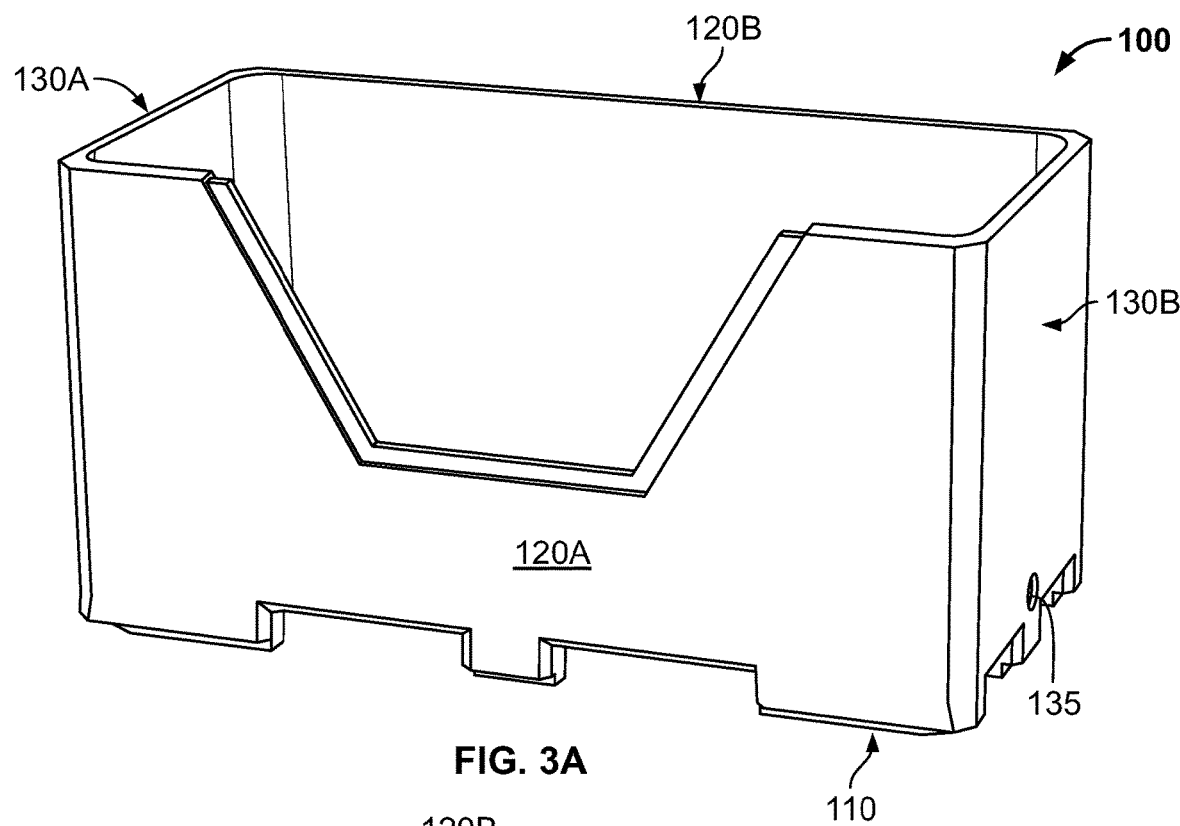
FIG. 3A is a front view of a preferred container according to the present invention (shown empty and with access panel removed).

As shown in FIG. 3A, a five-sided box 100 is the basic container component. The box 100 has a base 110, a pair of upwardly extending side walls 120A, 120B, a pair of upwardly extending end walls 130A, 130B connected with the side walls to form the box. Importantly, the walls and base are smoothly connected (preferably of a single piece of material) so that there is no accumulation of material in the corners and inside edges.

Figure 3B:
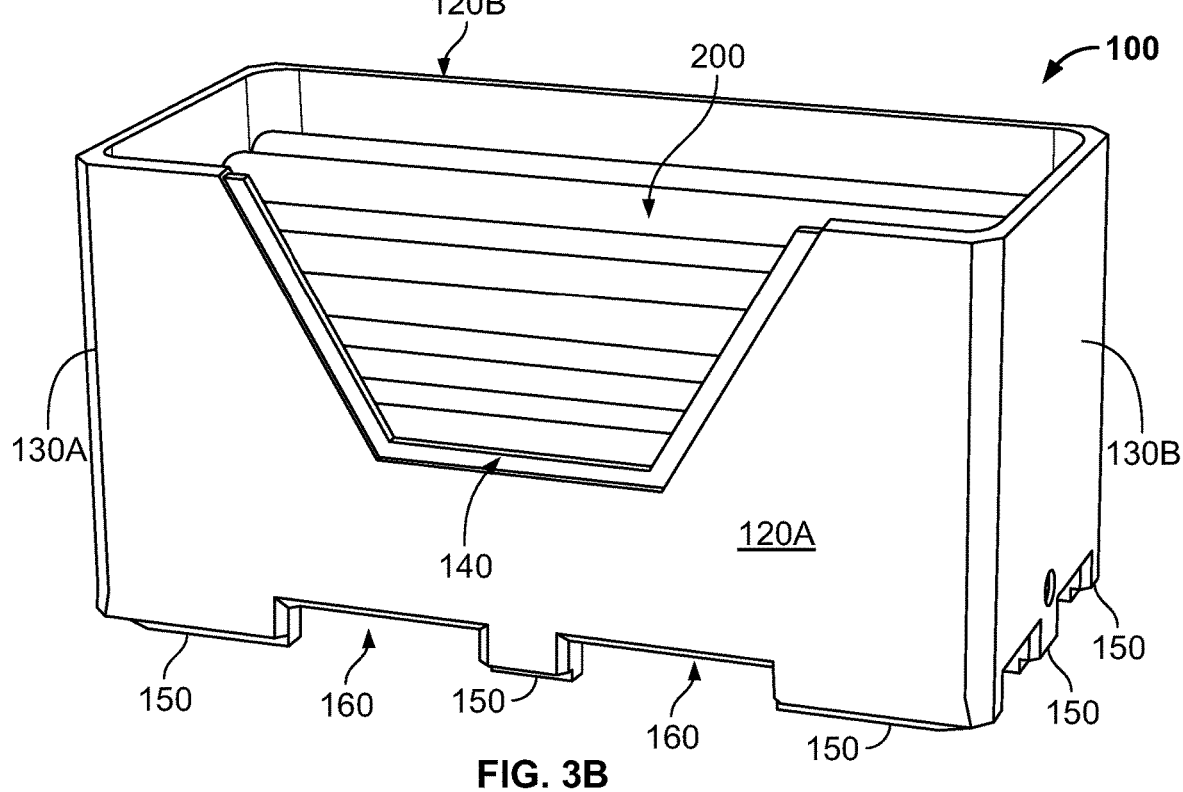
FIG. 3B is a front view of the container of FIG. 3A (with meat logs).

One or both side walls 120A, 120B may include an access window 140 as shown to facilitate loading. This may be a quadrilateral window (preferably trapezoidal as shown, having a longer top "edge" than bottom edge, and upwardly tapering sides). This facilitates loading and unloading of meat logs 200, which can be stacked inside the box, as shown in FIG. 3B.

The base 110 of the box preferably includes feet or posts 150 (preferably integral with the rest of the box) that have gaps 160 between them to permit safe and easy forklift access for lifting and stacking. Preferably, the design of the feet permits forklift access from any of the four sides.

The box as shown may include at least one drainage hole 135 provided near the base so that fluid may drain away from the box interior. The drainage hole may be threaded to allow a threaded plug (not shown) to be securely attached.

Figure 3C:
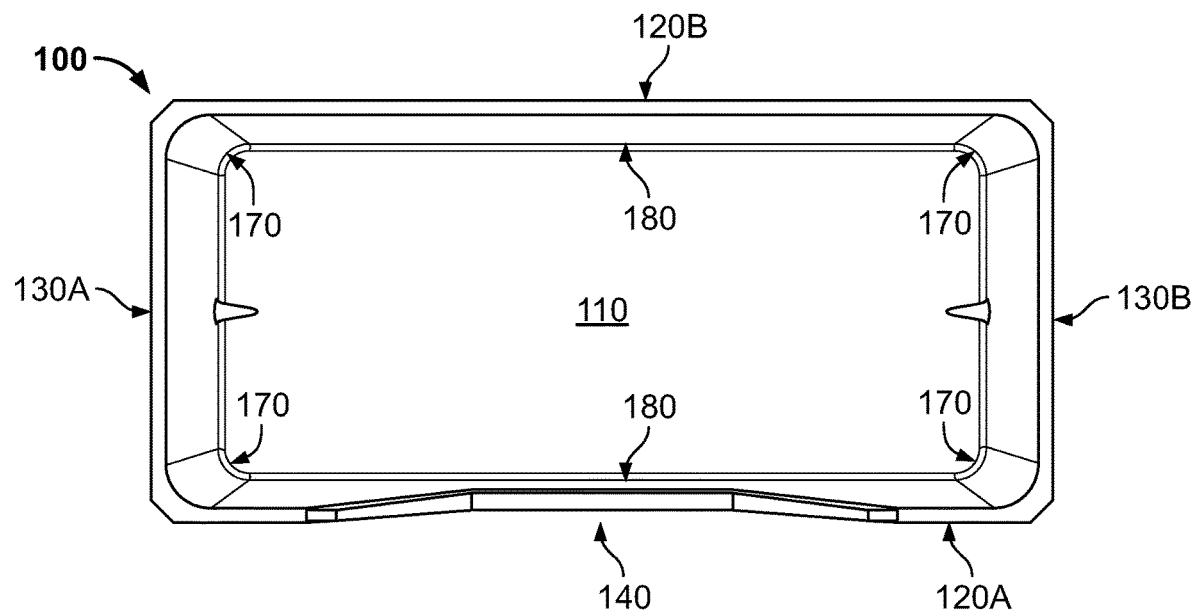
FIG. 3C is a top view of the container of FIG. 3A in empty state showing interior rounded corners and edges.
Figure 3D:
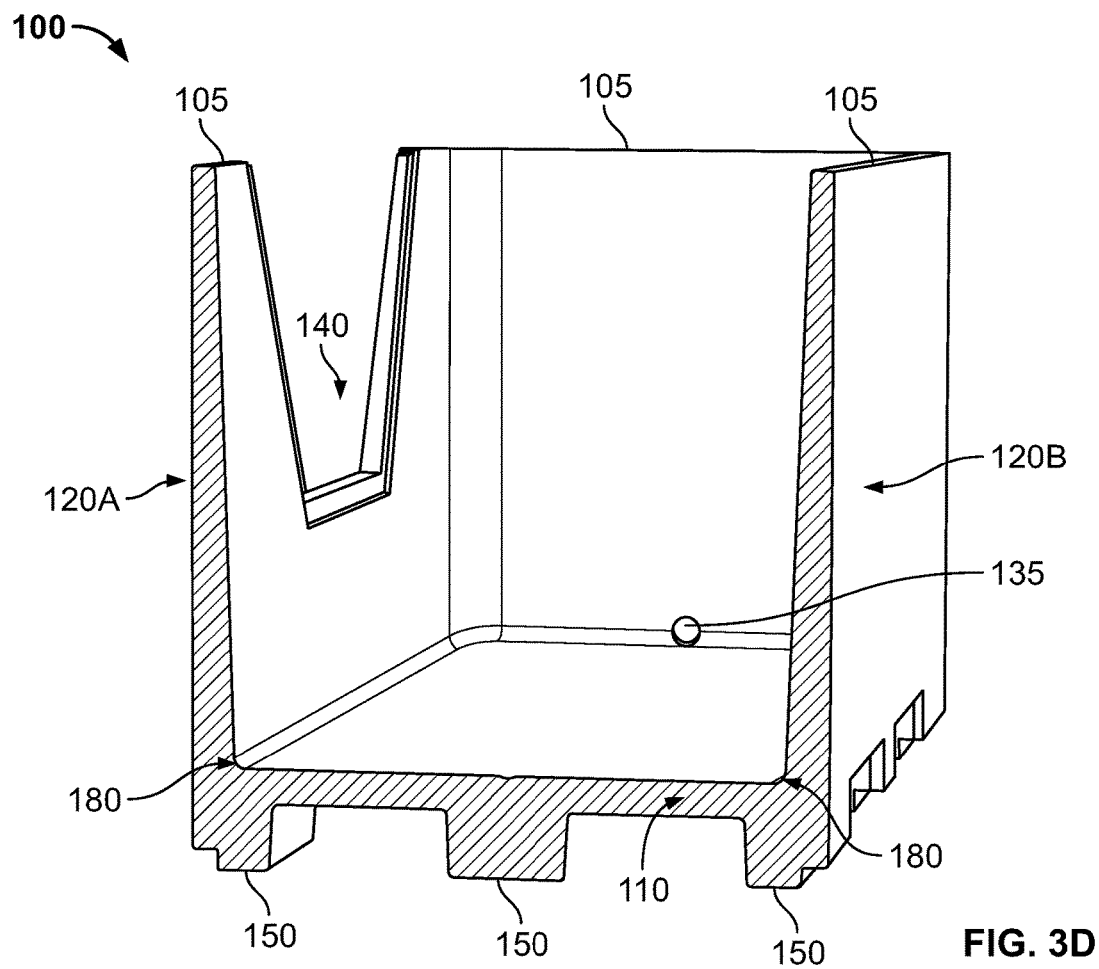
FIG. 3D is a sectional view of the container of FIG. 3C.

FIG. 3C is a top view of the box showing interior radiused corners 170 and edges 180. It is intended to avoid sharp corners or recesses on the interior or exterior surfaces which can allow for build up of contaminants between uses, and which are more difficult to access in cleaning. FIG. 3D also shows the radiused corners 170 and edges 180 in section. From FIG. 3D, you can also see the optional tapering of the walls 120A, 120B (also in 130A, 130B not shown) having a narrowed point at the top edge 105 (allowing for insertion of the lid 300). Shouldered configuration of the feet 150 can also be seen.

Figure 4A:
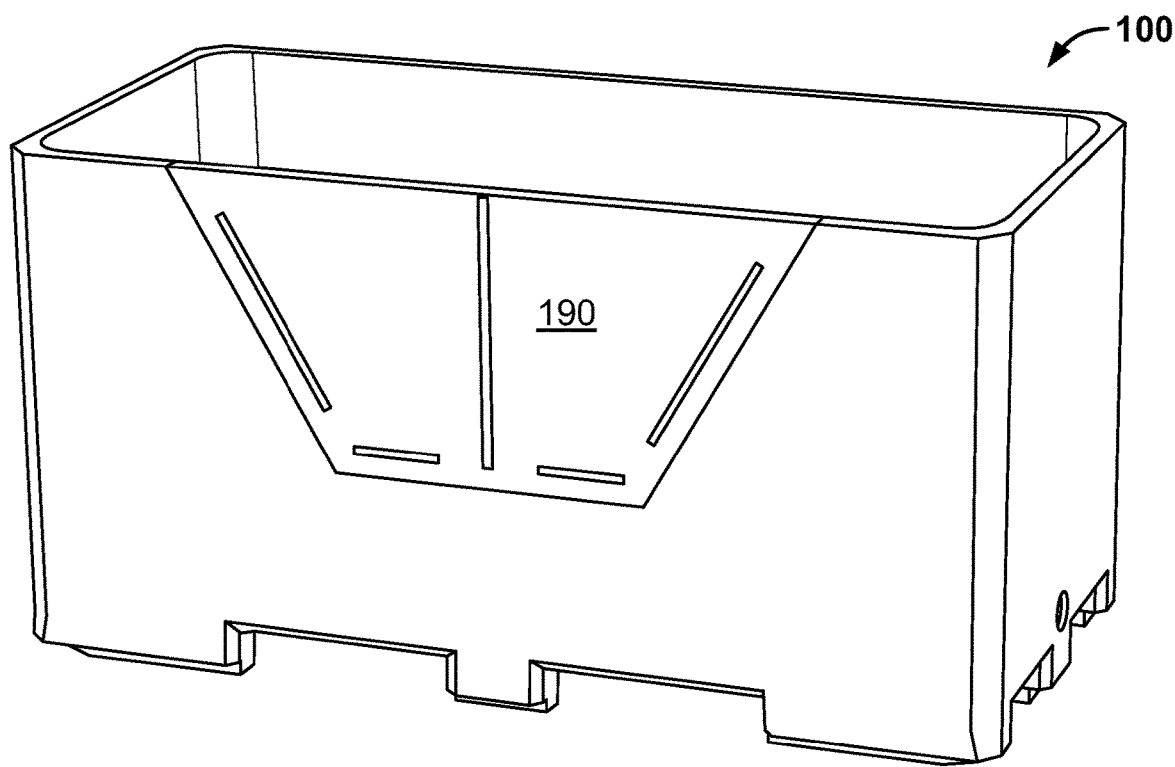
FIG. 4A is a front view of a preferred container according to the present invention (shown empty with access panel in place).
Figure 4B:
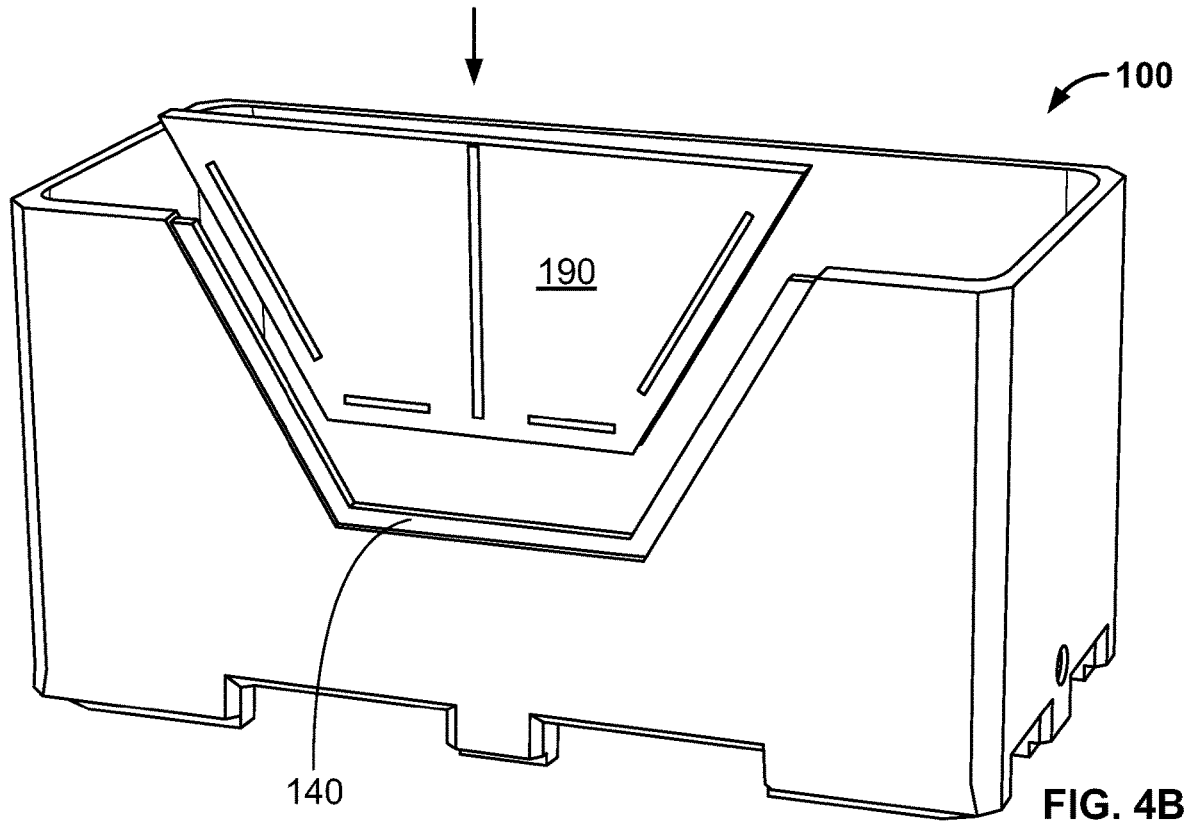
FIG. 4B is a front view of the container of FIG. 4A, showing sliding entry of access panel.

FIG. 4A shows the box 100 with the access panel 190 in place. As shown in FIG. 4B, the access panel is inserted and removed by simply sliding. The trapezoidal shape, as well as the tongue-and-groove features of the panel 190 and corresponding window 140, lends strength to the overall assembly. As the features of the joint are inside, the outer surface does not need to have exterior hooks or knobs to secure the access panel, which can break or cause damage or injury. Accordingly, the boxes can also be placed in very close abutment for storage or shipping.

Figure 5:
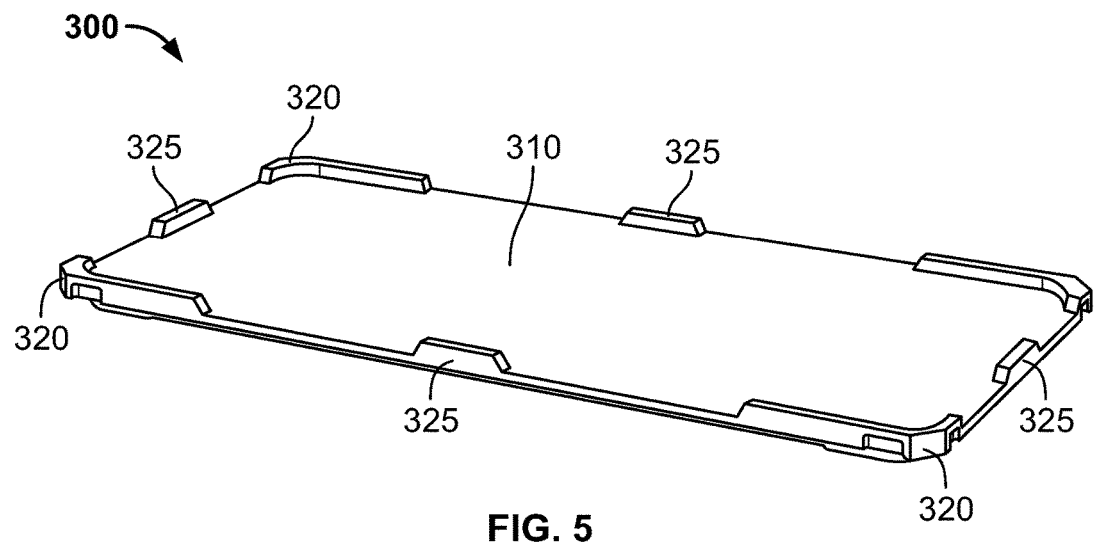
FIG. 5 is a top view of a lid for a container system.
Figure 6:
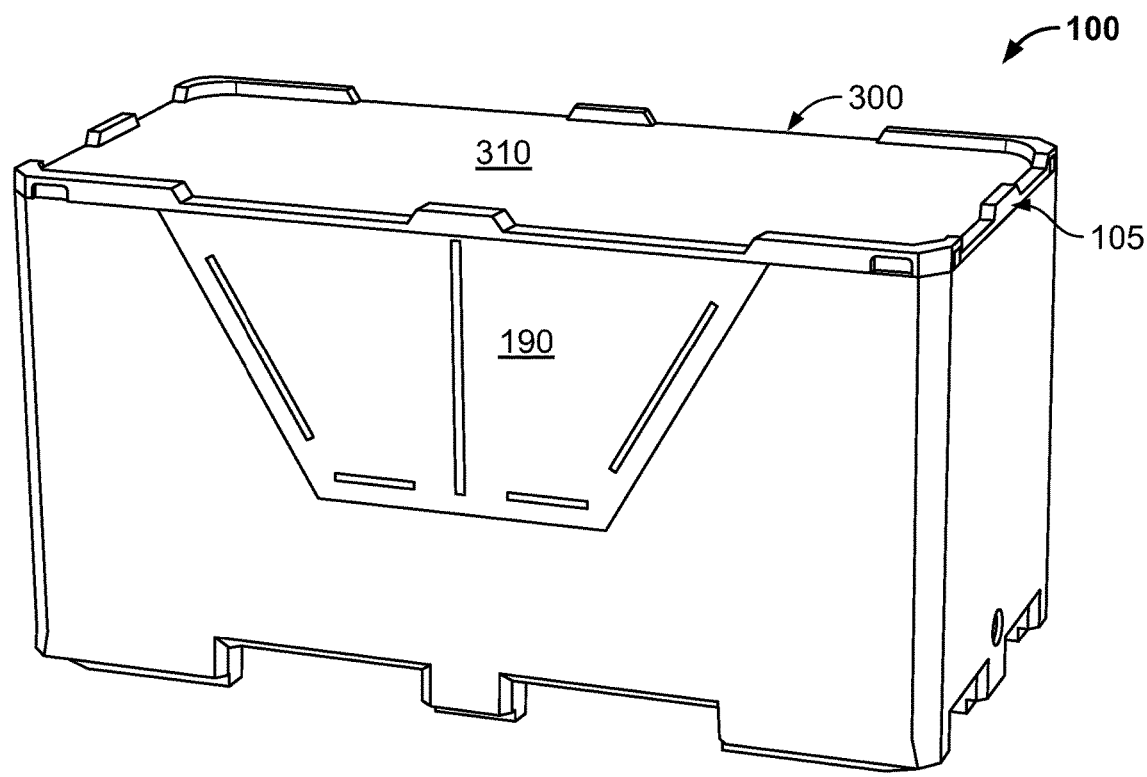
FIG. 6 is a front view of the assembled container system with lid and side access panel in place.
Figure 7:
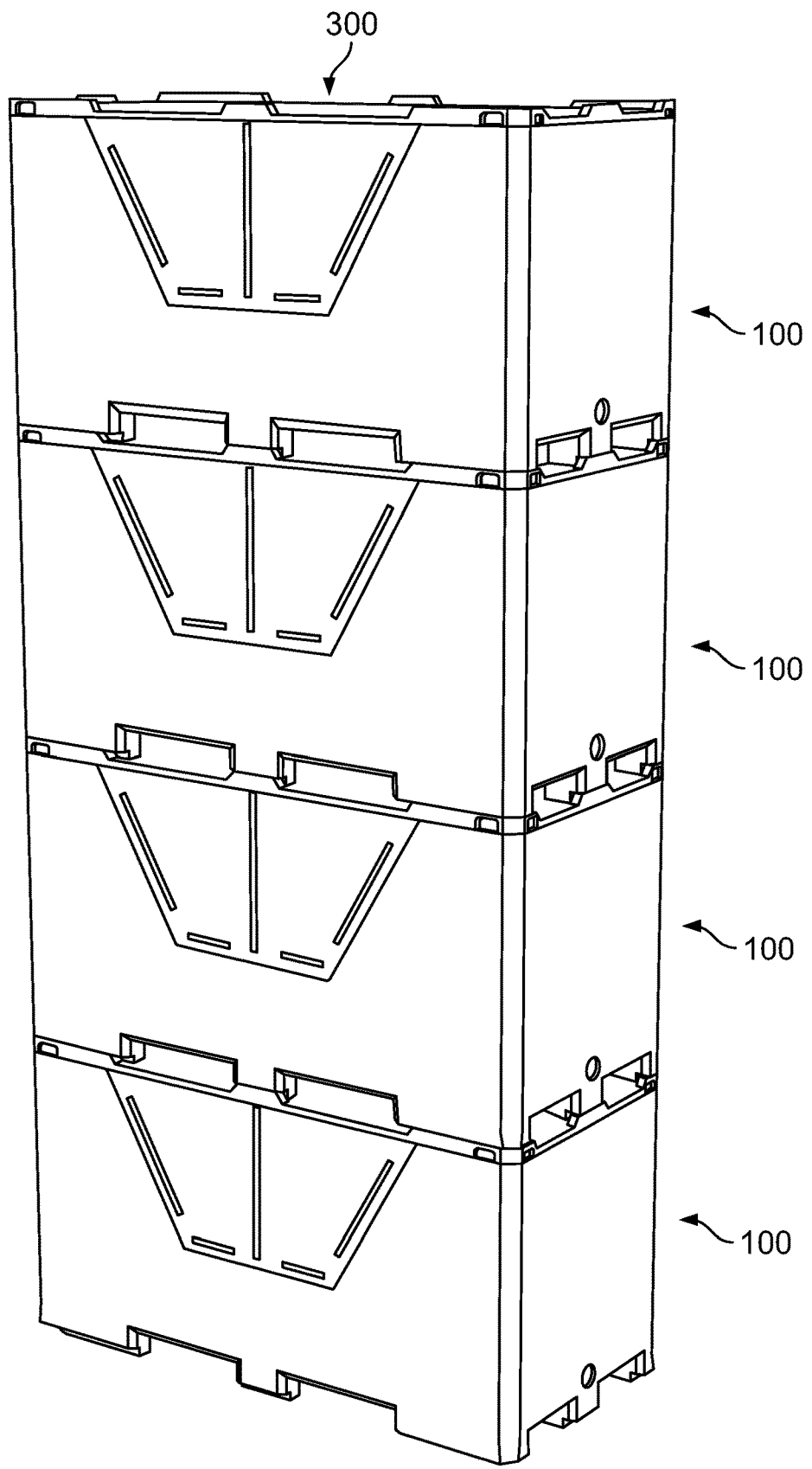
FIG. 7 is a front view of assembled container systems in a stacked configuration.

FIG. 5 shows the lid 300 of the box. Shown is the top surface 310 of the lid. The lid seats snugly in the inner diameter of the upper edge 105 of the box 100 and upper edge of the access panel 190 (as shown in FIG. 6). The lid 300 preferably includes alignment features 320, 325 on the top surface. These assist in inserting and removing the lid, as well as allowing stacking of the assembled container systems as shown in FIG. 7. For stacking, the feet 150 of an immediately upper box nest snugly with the alignment features 320, 325 of the lid 300 of the immediately lower box 100 to provide a secure stacked arrangement. As shown in FIG. 3D, the feet may be shouldered to facilitate the nesting relationship with the features of the lid.

Figure 8A:
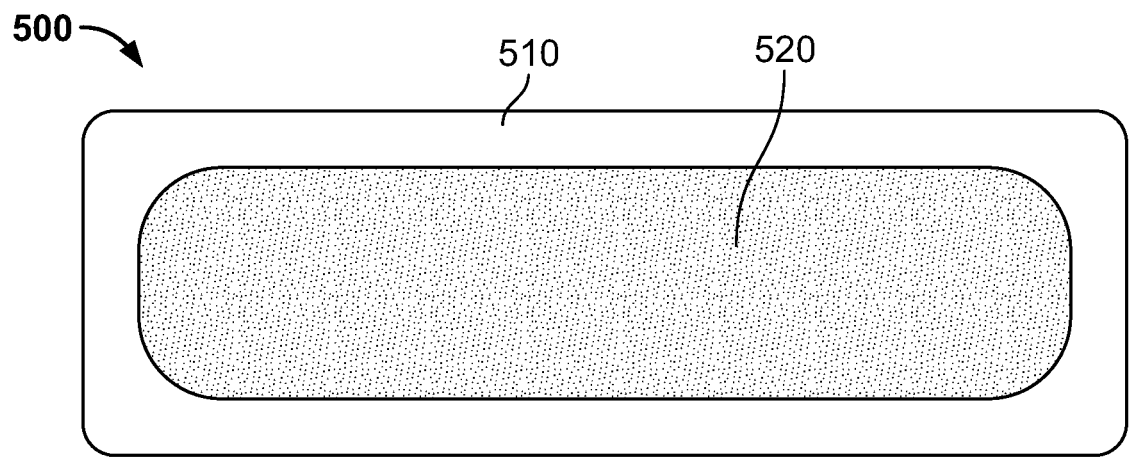
FIG. 8A is a sectional view of a preferred layered molded polyethylene material used for the container box.
Figure 8B:
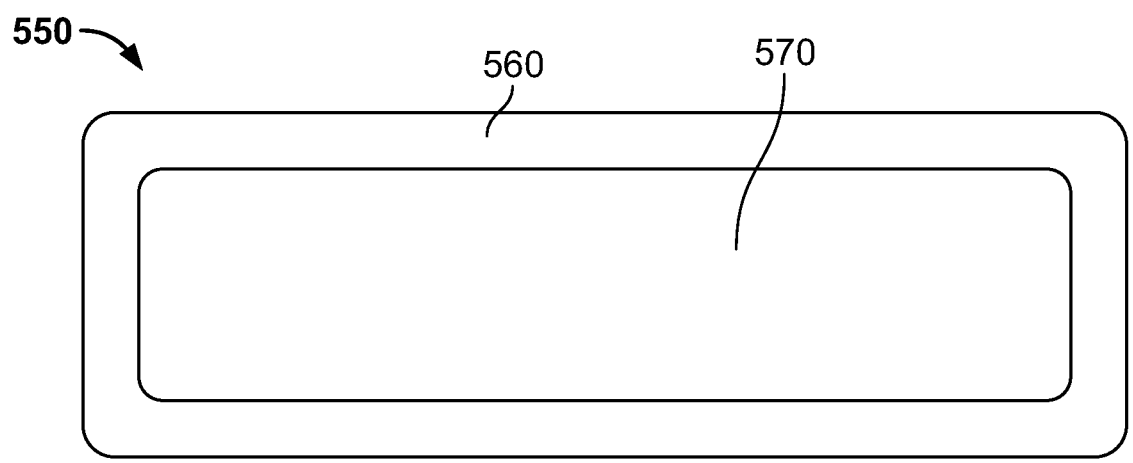
FIG. 8B is a sectional view of a preferred hollow molded polyethylene material used for the container lid and side access panel.

FIG. 8A shows a sectional view of the presently preferred wall and base material 500. Molded polyethylene forms the outer skins 510, and the interior core 520 is comprised of closed cell polyethylene foam. The overall structure is lightweight and durable. As shown in FIG. 8B, a hollow variation of the material 550, having outer skins 560 with a hollow core 570 (instead of a foamed core) may be used for the lid 300 and access panel 190 to save even more weight.

The box 100, access panel 190 and lid 300 can be manufactured using rotational molding. This process, also called rotomolding or rotocast, is a thermoplastic process for producing hollow parts by placing powder or liquid resin into a hollow mold and then rotating that tool bi-axially in an oven until the resin melts and coats the inside of the mold cavity. The interior foamed core is made by injecting polyethylene with a blowing agent which creates a foamed substance which thermally fuses with the walls of the skin. The finished walls, as is best seen from the exemplary slice in FIG. 8A, have a sealed layered structure with closed cell skins on all outside surfaces. While polyethylene foam exhibits thermal insulation properties, its primary function is to provide rigidity, strength and robustness to the container providing a superior alternative to legacy products.

The skins are thick and robust in their own right. Even without polyethylene foam, this would be a more durable product than a comparable product produced as a single wall, rotationally molded or injection molded. In the event the skin is compromised, it can easily be remedied through the process of plastic welding. Often a competitive single wall cannot be repaired and must be disposed of.

Importantly, the access panel and lid of the system are separate components that are not attached using hinges, straps, latches or other hardware that can fail and/or be difficult to maintain or clean.

The container can be made to include RFID, data loggers, bar codes/QR codes and other sensors (not shown) to improve traceability or to monitor cargo conditions.

Preferably, the finished box is at least 5 feet in length, and at least 2 feet in width (and at least 2 feet deep). Preferably, the box has an interior volume of at least approximately 20 ft$^3$ (and more preferably, has an interior volume of approximately 40-50 ft$^3$). The walls are typically but not exclusively 1 inch in thickness whereas the base is generally thicker due to the rigors of the material handling process the container must withstand.

Preferably, the combined overall weight of the container, access panel, and lid is less than 500 lbs (and more preferably less than 400 lbs).

Because the container system is itself so much lighter than prior art coffins, the system allows for more meat weight to be transported, allowing for an overall transportation energy and cost savings.

Moreover, the material, unlike stainless steel, has fewer employee hazards (smooth surfaces and edges, lighter weight for moving in a facility, soundless scraping), and easier cleaning and sanitizing. This promotes better food and employee safety.

The scope of the claims should not be limited by the preferred embodiments set forth in the foregoing disclosure, but should be given the broadest purposive construction consistent with the description as a whole and having regard to equivalents set forth or implied. In particular, it should be noted that although "meat" and "meat products" are described herein as a preferred application for the container, the container will also have ready applications for other perishable and non-perishable food products.

The invention claimed is:

1. A reusable container for storage and transport of a perishable food product, the container comprising:
a base having shouldered feet to facilitate a nesting relationship with corresponding alignment features of another container below when stacked;
a pair of upwardly extending side walls;
a pair of upwardly extending end walls connected with the side walls to form a generally rectangular box having four interior edges and four interior corners where the side and end walls join the base;
a window formed in at least one of the side walls or end walls having one of a tongue feature and groove feature, the window being sized and positioned to facilitate loading and unloading of food product;
a removable access panel being shaped to removably fit in the window, and having another one of a tongue feature and groove feature that cooperates with the one of the tongue feature and the groove feature of the window when the removable access panel is fitted in the window;
the box being integrally formed of food grade molded polyethylene such that each of the four interior edges and four interior corners has a rounded interior profile to prevent accumulation of material and facilitate sanitation between uses; and
the molded polyethylene of the box being formed of an insulating polyethylene foam having outer skins of solid polyethylene,
wherein the shouldered feet comprise at least two sets of shouldered side feet, each set extending below one of the side walls, each shouldered side foot in a set being adjacent to a corner of the base below one of the side walls, wherein the shoulder on each of the shouldered side feet extends outward so that an outer edge of the shouldered side foot is flush with an outer surface of the side wall, so that when the container sits on a surface, the shoulders of the shouldered side feet are spaced apart from the surface, and when the container is stacked on another container, the shoulders of the shouldered side feet each abut an upper edge of the side walls of the other container and the other portion of each shouldered side foot extends below the upper edge of the side wall of the other container.

2. The reusable container of claim 1, wherein the insulating foam of the polyethylene box is a polyethylene foam.

3. The reusable container of claim 1, wherein an upper edge of each of the side and end walls is configured to receive a removable lid.

4. The reusable container of claim 1, wherein at least one of the side or end walls has a drainage hole proximate to the base.

5. The reusable container of claim 4, wherein the drainage hole is threaded.

6. The reusable container of claim 1, wherein the box is at least 5 feet in length, and at least 2 feet in width.

7. The reusable container of claim 1, wherein the box has an interior volume of at least approximately 40 cubic feet.

8. The reusable container of claim 1, wherein the walls are at least 1 inch thick.

9. The reusable container of claim 1, wherein the box is rotationally molded.

10. The reusable container of claim 1, wherein the feet are spaced apart to provide gaps for receiving forks of a forklift.

11. The reusable container of claim 1, wherein the box has a weight of less than 400 lbs.

12. The reusable container of claim 1, wherein the box is manufactured using a rotational molding process.

13. A reusable container system for storage and transport of a perishable food product, comprising a plurality of stackable reusable containers, each container comprising:
a removable access panel;
a base having shouldered feet to facilitate a nesting relationship with corresponding alignment features of another container below when stacked;
a pair of upwardly extending side walls;
a pair of upwardly extending end walls connected with the side walls to form a generally rectangular box having four interior edges and four interior corners where the side and end walls join the base; and
a window formed in at least one of the side walls or end walls being sized and positioned to facilitate loading and unloading of food product; and
a removable lid shaped and configured to cover the container, wherein:
the box is integrally formed of food grade molded polyethylene such that each of the four interior edges and four interior corners of the box has a rounded interior profile to prevent accumulation of material and facilitate sanitation between uses, the removable access panel is shaped to removably fit in the window, and the window and the removable access panel have cooperating tongue and groove features that fit together when the removable access panel is fitted in the window, wherein the shouldered feet comprise at least two sets of shouldered side feet, each set extending below one of the side walls, each shouldered side foot in a set being adjacent to a corner of the base below one of the side walls, wherein the shoulder on each of the shouldered side feet extends outward so that an outer edge of the shouldered side foot is flush with an outer surface of the side wall, so that when the container sits on a surface, the shoulders of the shouldered side feet are spaced apart from the surface, and when the container is stacked on another container, the shoulders of the shouldered side feet each abut an upper edge of the side walls of the other container and the other portion of each shouldered side foot extends below the upper edge of the side wall of the other container.

14. The reusable container system of claim 13, wherein the combined overall weight of the container, access panel, and lid is less than 500 lbs.

15. The reusable container system of claim 13, wherein the window is quadrilateral in shape.

16. The reusable container system of claim 13, wherein the window is trapezoidal in shape having a wider upper edge than lower edge.

17. The reusable container system of claim 13, wherein the removable access panel is slidably receivable in the window.

18. The reusable container system of claim 13, wherein the insulating foam is a polyethylene foam.

19. The reusable container system of claim 13, wherein at least one of the lid and the removable access panel is hollow.

20. A reusable container for storage and transport of a perishable food product, the container comprising:
a base having shouldered feet to facilitate a nesting relationship with corresponding alignment features of another container below when stacked;
a pair of upwardly extending side walls;
a pair of upwardly extending end walls connected with the side walls to form a generally rectangular box having four interior edges and four interior corners where the side and end walls join the base;
a window formed in at least one of the side walls or end walls being sized and positioned to facilitate loading and unloading of food product; and
a removable access panel being shaped to removably fit in the window, wherein:
the box is integrally formed of food grade molded polyethylene such that each of the four interior edges and four interior corners has a rounded interior profile to prevent accumulation of material and facilitate sanitation between uses,
wherein the window and the removable access panel have cooperating tongue and groove features that fit together when the removable access panel is fitted in the window,
wherein the shouldered feet comprise at least two sets of shouldered side feet, each set extending below one of the side walls, each shouldered side foot in a set being adjacent to a corner of the base below one of the side walls, wherein the shoulder on each of the shouldered side feet extends outward so that an outer edge of the shouldered side foot is flush with an outer surface of the side wall, so that when the container sits on a surface, the shoulders of the shouldered side feet are spaced apart from the surface, and when the container is stacked on another container, the shoulders of the shouldered side feet each abut an upper edge of the side walls of the other container and the other portion of each shouldered side foot extends below the upper edge of the side wall of the other container.

21. The reusable container according to claim 20, wherein the molded polyethylene of the box is formed of an insulating foam having outer skins of solid polyethylene.

22. The reusable container according to claim 21, wherein the insulating foam of the polyethylene box is a polyethylene foam.

* * * * *